UNITED STATES PATENT OFFICE.

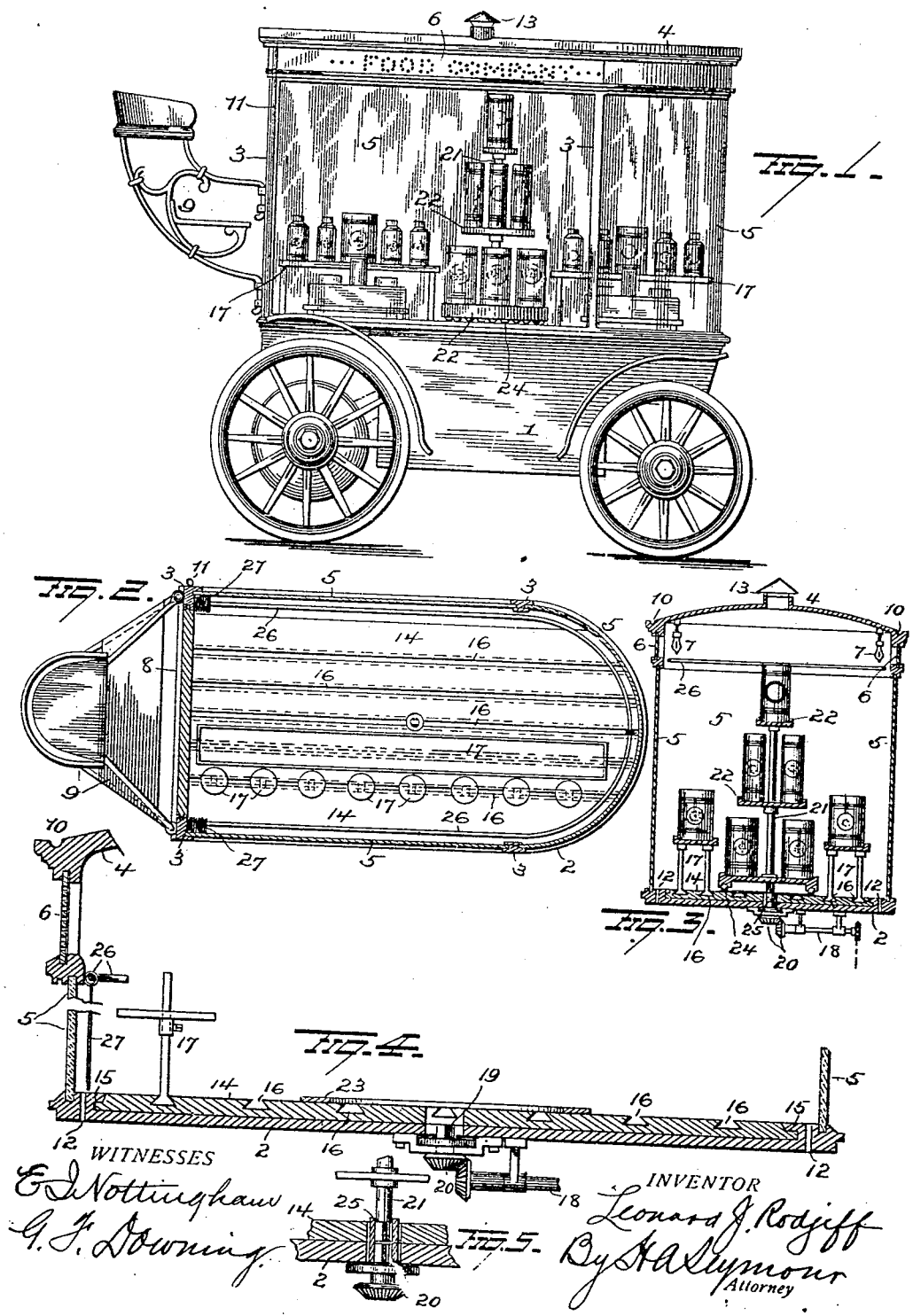

LEONARD J. RODJEFF, OF CHICAGO, ILLINOIS.

DISPLAY-VEHICLE.

No. 819,600.  Specification of Letters Patent.  Patented May 1, 1906.

Application filed October 25, 1905. Serial No. 284,396.

*To all whom it may concern:*

Be it known that I, LEONARD J. RODJEFF, a resident of Chicago, in the county of Cook and State of Illinois, have invented certain new and useful Improvements in Display-Vehicles; and I do hereby declare the following to be a full, clear, and exact description of the invention, such as will enable others skilled in the art to which it appertains to make and use the same.

My invention relates to an improved display-vehicle, the object of the invention being to provide an improved vehicle adapted for the display of merchandise or other goods which may be transported about the streets to display the goods in a conspicuous and attractive manner.

A further object is to provide a vehicle with transparent walls and also provide a removable goods-supporting platform, which may be removed and goods located thereon before the platform is inserted in the vehicle. Thus by providing a number of such platforms a new display of goods may be always provided and loss of time in changing the display be obviated.

A further object is to provide in a vehicle of this character improved mounting for display-stands and improved signs which are to be illuminated at night.

A further object is to provide an improved display-vehicle which will be water-tight, having water trough or groove and outlet-spout, provide improved entrance and door-closure therefor, and provide improved seat-support for the operator having the vehicle under his control.

With these and other objects in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a view in horizontal section. Fig. 3 is a view in vertical cross-section. Fig. 4 is an enlarged view in cross-section, showing the body construction; and Fig. 5 is an enlarged detail view.

1 represents a motor-car, preferably of the electric type, so that electric lights may be operated to illuminate the vehicle at night; but the car may be otherwise operated or may constitute a vehicle without self-propelling means.

2 represents the bottom of my improved display-body, located on the car or running-gear 1, provided at suitable intervals with uprights 3, supporting a metallic top 4, and glass 5 is located between the uprights 3 at the sides and front end of the vehicle, so that the interior of the body can be clearly seen. The front of the body is preferably rounded, although the body may be made in any desired shape. Grooved guides are located in the sides near the top of the body to receive removable signs 6, and lights 7 are located back of the signs to illuminate them. These signs may be changed at will to suit the display or the operator's taste.

The rear end of the body is closed by a door 8, mounted to slide vertically, and a seat-supporting bracket 9 is hinged at one side to one corner upright and removably secured to the other, so that the said bracket can be swung entirely to one side to permit free access to the body when the sliding door 8 is raised. A groove or gutter 10 is provided around the top to catch the water and direct the same into a spout 11 at one rear corner of the body to protect the vehicle from water which would otherwise flow over the sides of the body, and air-inlets 12 are located in bottom 2, and a ventilator 13 is provided in the top of the body to permit a free circulation of air, and such ventilation will prevent sweating of the glass to interfere with a perfect display of goods.

14 represents my improved display-platform, which is constructed to slide into grooves 15 in the bottom 2 and lie flush with the bottom. This platform is of the proper width to enter the body when the door 8 is raised and forms the support for the goods displayed. The platform is made with dovetailed grooves 16 to receive display-stands 17, some of which may be adjustable, as shown in Fig. 4, and they may be arranged to support shelves or may constitute individual supports for the goods. In fact, the display-stands will be arranged in the best manner to artistically display the goods and will be changed to suit varying conditions. A series of these platforms will be provided, so that they may be dressed outside of the vehicle and afterward slid therein with their entire display in position, hence saving time and securing a better display than could be the case were the dresser compelled to move about in the crowded body.

A curtain rod or rods 26 are located around the body just inside the glass walls, and a curtain 27 is mounted on said rod or rods and is adapted to be moved around inside the body to protect the goods or hide them when desired.

Below the bottom 2 a horizontal shaft 18 is mounted and connected by suitable sprocket wheels and chains or other mechanism with an axle of the vehicle or motor for driving the same, and this shaft transmits motion to a short vertical shaft-stub 19 by means of beveled gears 20. This stub 19 is made angular and is below the plane of the platform 14, so as not to interfere with the movement of the latter. On the platform I have illustrated a display-tower consisting of a central vertical shaft 21 and shelves 22, on which the goods are located, and the bottom shelf is separated by ball-bearings 24 from a ring 23 on the platform to permit free turning of the tower. A coupling-sleeve 25 is located on the lower end of shaft 21, so that when this shaft is in position the coupling 25 can be moved down onto shaft-stub 19 and motion transmitted to the tower to turn the same.

The particular arrangement of display-stands must be left to the user and will be changed from time to time to vary the display, according to the goods.

A great many slight changes might be made in the general form and arrangement of the parts described without departing from my invention. Hence I do not restrict myself to the precise details set forth, but consider myself at liberty to make slight changes and alterations as fairly fall within the spirit and scope of my invention.

Having fully described my invention, what I claim as new, and desire to secure by Letters Patent, is—

1. A traveling-vehicle body having transparent walls, a removable platform within said body, display-fixtures and means for removably securing the display-fixtures to said removable platform.

2. A display-vehicle body having transparent walls, a removable platform within said body, said platform having a series of grooves, and removable display-fixtures mounted in said grooves.

3. A display-vehicle body having transparent walls, and having ventilating-openings in its bottom and a ventilator in its top, a door at one end of said body, a slidable platform mounted upon the bottom of the body and display-fixtures on said platform.

4. A display-vehicle body having transparent walls, the bottom of said body having guideways, a slidable platform movable in said guideways, said platform having grooves, and display-fixtures movable in the grooves in the platform.

5. The combination of a vehicle-body having transparent walls, a sliding door closing one end thereof, a removable display-platform mounted to slide into and from the body through the doorway, and grooves in said platform to receive removable display-stands.

In testimony whereof I have signed this specification in the presence of two subscribing witnesses.

LEONARD J. RODJEFF.

Witnesses:
 S. W. FOSTER,
 A. W. BRIGHT.